J. E. SCOTT.
MACHINE FOR TURNING SHOES.
APPLICATION FILED JUNE 2, 1919.

1,395,741.

Patented Nov. 1, 1921.
6 SHEETS—SHEET 1.

Witness
Philip E. Barnes

Inventor
John E. Scott
By
Henry J. Miller
Attorney

J. E. SCOTT.
MACHINE FOR TURNING SHOES.
APPLICATION FILED JUNE 2, 1919.

1,395,741. Patented Nov. 1, 1921.

WITNESSES:
Philip E. Barnes

INVENTOR
John E. Scott
BY Henry J. Miller
ATTORNEY

J. E. SCOTT.

MACHINE FOR TURNING SHOES.

APPLICATION FILED JUNE 2, 1919.

1,395,741. Patented Nov. 1, 1921.

Witness

Philip E. Barnes

Inventor

John E. Scott

By Henry J. Miller

Attorney

J. E. SCOTT.
MACHINE FOR TURNING SHOES.
APPLICATION FILED JUNE 2, 1919.

1,395,741. Patented Nov. 1, 1921.
6 SHEETS—SHEET 4.

WITNESSES:
Philip E. Barnes

INVENTOR
John E. Scott
BY Henry J. Miller
ATTORNEY

J. E. SCOTT.
MACHINE FOR TURNING SHOES.
APPLICATION FILED JUNE 2, 1919.

1,395,741.

Patented Nov. 1, 1921.
6 SHEETS—SHEET 5.

WITNESSES:
Philip E. Barnes

INVENTOR
John E. Scott
BY Henry J. Miller
ATTORNEY

J. E. SCOTT.
MACHINE FOR TURNING SHOES.
APPLICATION FILED JUNE 2, 1919.

1,395,741. Patented Nov. 1, 1921.

WITNESSES:
Philip E. Barnes

INVENTOR
John E. Scott
BY Henry J Miller
ATTORNEY

UNITED STATES PATENT OFFICE.

JOHN E. SCOTT, OF LYNN, MASSACHUSETTS, ASSIGNOR TO LAMBERT SHOE MACHINERY COMPANY, A CORPORATION OF MASSACHUSETTS.

MACHINE FOR TURNING SHOES.

1,395,741. Specification of Letters Patent. Patented Nov. 1, 1921.

Application filed June 5, 1919. Serial No. 302,292.

*To all whom it may concern:*

Be it known that I, JOHN E. SCOTT, a citizen of the United States, residing at Lynn, in the county of Essex and State of Massachusetts, have invented certain new and useful Improvements in Machines for Turning Shoes, of which the following is a specification, reference being had therein to the accompanying drawings.

This invention relates to a machine for turning shoes and more particularly to a machine arranged to be power driven and to turn the top portions of turn shoes.

The invention embodies certain features of a machine disclosed in an application of John E. Scott, Ser. No. 72,787, filed Jan. 4, 1916, for a machine for turning shoes, the mechanism therein disclosed being an improvement thereon.

The present invention relates to improvements in the machine disclosed in the above application, certain of said improvements relating to the means for supporting the turning devices whereby the operation of the machine is made more certain.

The invention further seeks to provide improved turning devices which are adapted to securely grip and feed forward the shoe stock during the turning operation.

The invention also contemplates the employment of improved driving mechanism for operating the turning devices as well as means for controlling said driving mechanism and for positioning certain implements employed to assist the turning devices in performing their operation.

The invention also comprises devices adapted to spread the toe portion of the upper during the turning of the shoe whereby to prevent wrinkling or bunching of the upper during this process.

The invention provides furthermore for properly controlling the operation of said spreading device and for bringing it into operation with the turning devices prior to the initiation of the turning operation.

Other and further objects and advantages of the invention will appear more in detail in the accompanying specification, and will be particularly pointed out in the appended claims, reference being had to the annexed drawings for a disclosure of a preferred embodiment thereof.

In the drawings, Figure 1 is a side elevation of the complete machine, showing the toe-spreading device in an inoperative position ready for the placing of a shoe in position upon the shoe-supporting horn;

Figure 1:
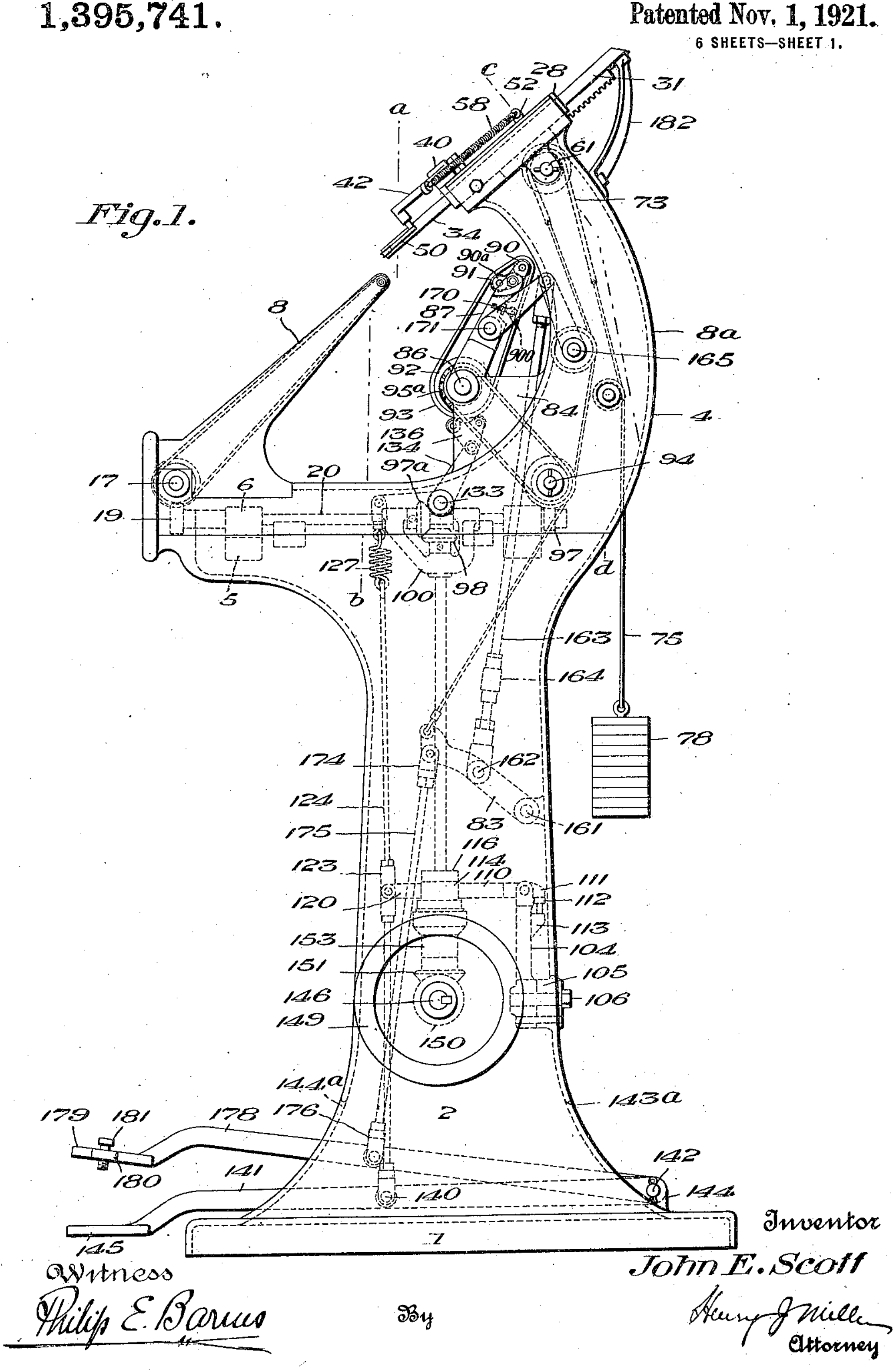
Figure 4:
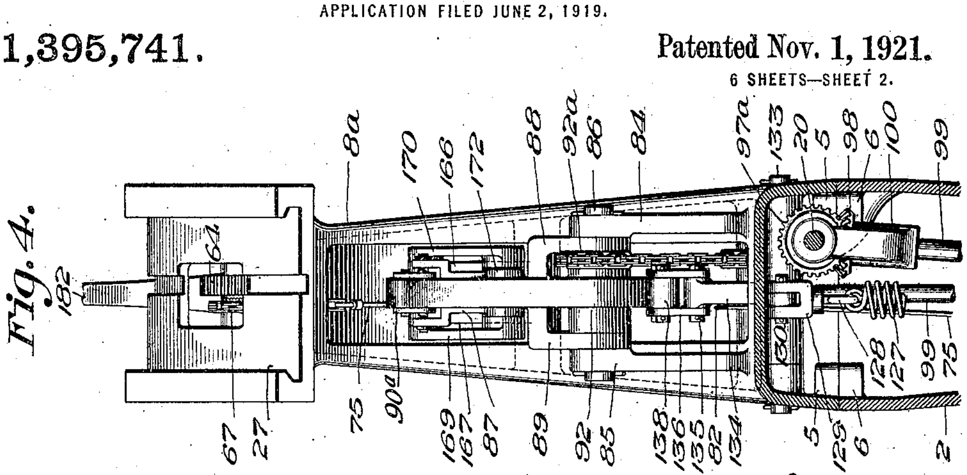
Fig. 4 is a vertical transverse cross section of the upper portion of the machine taken on the line *a*–*b* of Fig. 1.

The frame of the machine comprises a base member 1, from which rises a hollow column 2, the upper end of which is formed with a machined surface 3, upon which rests the base of a hollow machine head 4, said column and head being provided with pairs of coöperating lugs 5, 6, through which are passed connecting bolts 7. The head 4 comprises a rearwardly inclined horn 8 and a curved, hollow bracket $8^a$. The horn 8, which is hollow and of substantially rectangular cross section, having a flat upper surface, may if desired be formed integrally with the member 4 or as a separate member suitably connected thereto.

*Turning chain.*

The upper and lower faces of the horn 8 are slotted at 9, 10 (Fig. 2) longitudinally of the horn, a web member 11 extending transversely of the horn adjacent its free end for strengthening the same. The slot 9 is of gradually decreasing depth toward the free extremity of the horn. The horn 8 is bifurcated at its free extremity, as seen at 12, 13, forming bearings for a pin 14 which passes transversely of the horn and supports between the forks 12, 13 a rotatable hexagonal roller 15.

Figures 15, 16, 17:
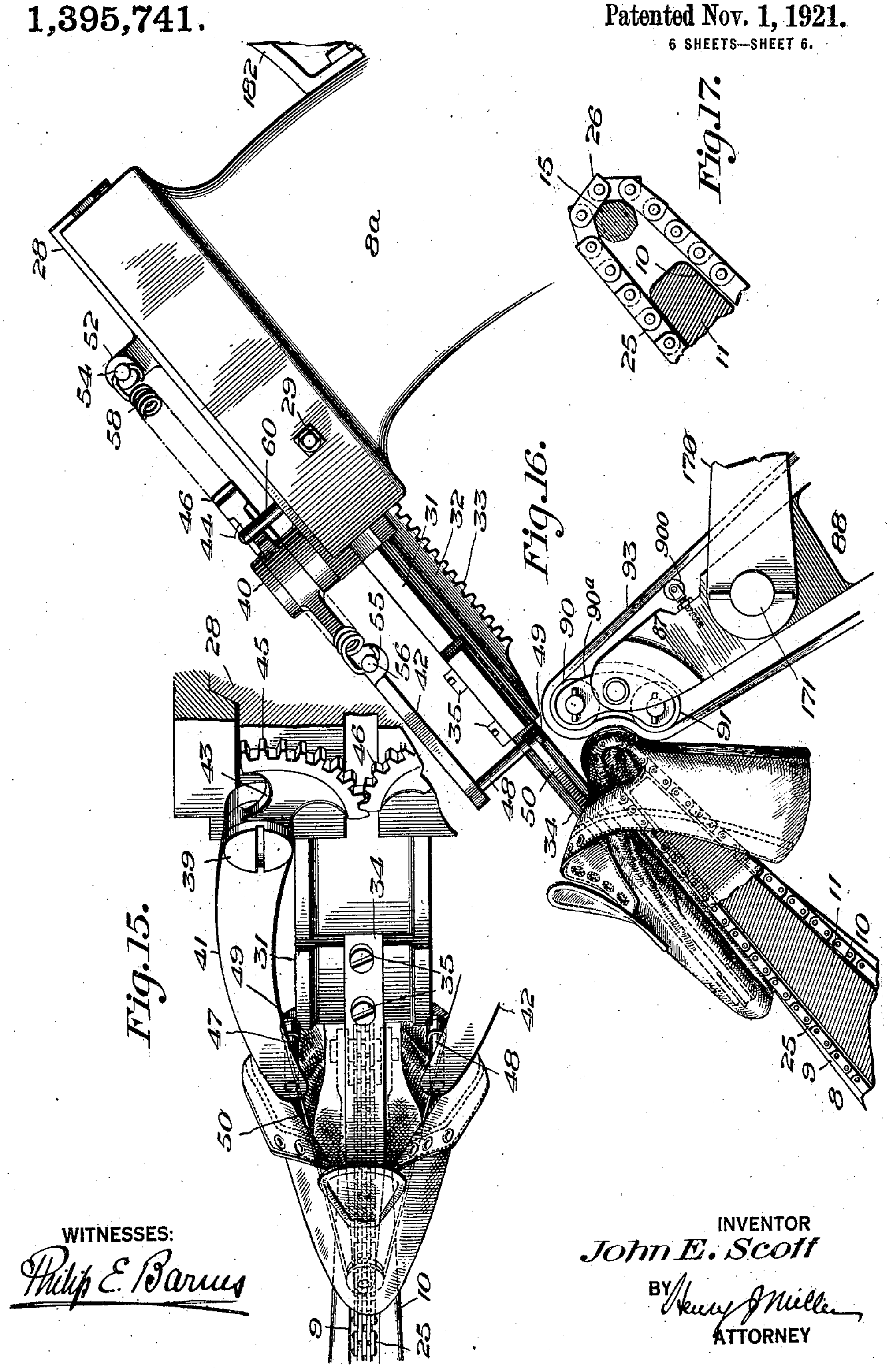
Fig. 15 is a partial plan view.
Fig. 16 is a side elevation of the toe-expanding device illustrating the different positions which it assumes during the turning operation.
Fig. 17 is a detail cross section of the upper end of the shoe-supporting horn showing the shoe-turning chain carried thereby.

In the frame at the base of the horn is journaled a transverse shaft 17 upon which is mounted a gear 18, said gear meshing with a gear 19 fixed upon a shaft 20 journaled for rotation in bearings 21, 22 carried by the frame. Fixed to the gear 18, as by means of screws 23, is a sprocket wheel 24, said sprocket wheel serving to guide and to drive a link belt or sprocket chain 25, said chain passing along the slots 9, 10 and over the hexagonal roller 15. As the chain lies within the slot 9, it is below the upper surface of the horn and is thus kept from contact with a shoe sole resting thereon except at that portion of the chain lying adjacent the extremity of the horn where the slot 9 becomes so shallow as to expose the upper portions of the chain links. As seen in Fig. 17, the links of this chain are each formed with an angular corner 26 at one end, this corner being substantially square, and it will be seen by reference to Fig. 17 that as the links pass over the hexagonal roller said angular corners 26 project out beyond the body of the chain for a purpose which will be hereinafter described.

*Toe expander.*

The bracket $8^a$ is curved forwardly and provided at its upper end with a channel or guideway 27 within which is mounted a slide member 28, said guideway being undercut to securely retain the slide member in proper position. A set screw 29 passes through the walls of the guideway and may be engaged with the member 28 whereby to hold the latter in desired position of adjustment.

The member 28 is provided at its underside with a central longitudinal T-slot 30, within which is mounted a secondary slide 31, this slide having projecting from its lower surface a fin 32 having formed upon its lower edge a series of rack teeth 33. Projecting from the forward end of the slide 31 is a rigid supporting rod 34 which may be fixed to the slide by means of screws 35 or in any similar or equivalent manner. Rod 34 is bifurcated at its forward end to form arms 36, $36^a$ providing bearings for a pin 37 upon which is mounted a guide roll 38.

Pivoted upon the upper surface of the member 28 near its forward end by means of pins 39, 40 are levers 41, 42, said levers having relatively short arms 43, 44 arranged in opposing relation and provided with intermeshing gear sectors 45, 46. The longer arms of said levers are curved outwardly and forwardly and have depending from their forward extremities pins 47, 48, these pins being provided with enlarged heads 49 at their lower ends. 50 is a band or strip of flexible material such as spring steel, leather or canvas, the central portion of which passes over and is supported by the roller 38 carried by the rod 34 and the free extremities of which are looped around the pins 47, 48 and secured thereto in any desirable manner, being herein shown as riveted together at 51 to form closed loops about the pins.

52 is a boss projecting from the upper surface of support 28 and having a pin 53 outstanding therefrom, said pin being provided near its end with an opening 54. 55 is a similar boss fixed to the lever arm 42, and also having a pin 56 provided with an opening 57. 58 is a coil tension spring, the opposite extremities of which are hooked into the openings 54, 57, respectively. By the above arrangement of parts it will be seen that the spring 58 tends to pull the arm 42 backwardly, and through the intermeshing gear sectors 45, 46 similarly actuates the arm 41, whereby the free extremities of the levers are separated as widely as the connecting strap 50 will permit, the latter thus being placed under considerable tension. A pair of pins 59, 60 may be provided on the upper surface of support 28 to limit the swing of the lever arms 41, 42 in a forward direction.

61 is a shaft extending transversely of the bracket $8^a$ immediately below the slide member 28, said shaft being journaled in bosses 62, 63 in said bracket, and having loosely mounted thereon a gear wheel 64, the teeth of which are arranged to mesh with the rack teeth 33.

The left hand face of the gear 64 is provided with a hub 65 having upon its end a series of triangular teeth 66 which form one element of a friction clutch or escapement. 67 is a sprocket wheel loosely mounted on the shaft 61 and provided upon its right hand face with a hub 68 having triangular teeth 69 arranged to mesh with the teeth 66. The sprocket 67 is slidable longitudinally of the shaft, and has one or more openings 70 within which are seated compression springs 71, the outer ends of which bear against corresponding pins 72 slidable within the openings and whose free extremities bear against the end of boss 63. By this arrangement of parts the sprocket wheel with its friction teeth 69 is resiliently pressed into engagement with the teeth 66 of the gear wheel 64, whereby rotation of the sprocket wheel tends to rotate said gear wheel, the friction clutch arrangement, however, providing for movement of said gear wheel independent of the sprocket when sufficient force is applied thereto.

Passing around the sprocket 67 is a sprocket chain 73, one end 74 of which is connected to a cord or other flexible device 75 which passes downwardly over a guide pulley 76 and out through an opening 77 in the bracket $8^a$ and has attached to its lower extremity a weight 78. The opposite end 79 of the chain 73 is connected to a similar flexible member 80 which passes downwardly within the bracket $8^a$ over guide pulleys 81, 82, and is connected at its lower end to the free extremity of a lever 83 hereinafter described.

*Turning belt.*

84, 85 are a pair of fins or brackets extending forwardly from the front face of bracket $8^a$, said fins providing bearings for a shaft 86. 87 is a lever having a bifurcated lower extremity forming spaced arms 88, 89, said arms having journal openings for the reception of the shaft 86 whereby the lever is swingingly supported. The free extremity of the lever has a curved rocker $90^a$ centrally pivoted thereon and provided at its opposite ends with guide rolls 90, 91, and between the spaced arms 88, 89 is mounted a guide roll 92 having a sprocket wheel $92^a$ fast upon its hub. An endless belt or strap 93 passes about the guide roller and over the small guide rolls 90, 91 mounted upon the ends of rocker $90^a$ and may be maintained in taut condition by the use of any desired form of belt tightener, such as illustrated at 900 for example. By reason of the location of guide rolls 90, 91, a stretch of belt is provided which, when forcibly pressed against the outer convex surface of a shoe sole bent about the end of horn 8 as seen in Fig. 16, becomes flexed to such an extent as to partially envelope such bent portion, contacting therewith throughout a substantial portion of its arc or curvature. The rocker provides for the self-adjustment of the guide rolls, whereby the pressure of the belt upon the sole surface throughout its arc of contact therewith is maintained substantially uniform regardless of slight variations in the character of the work.

94 is a transverse shaft journaled in the lower portion of the bracket $8^a$, and having loosely mounted thereon the guide roll 82 hereinbefore referred to and also a sprocket wheel 95. The sprocket wheel is fast to a gear 96 which meshes with a gear 97 carried upon the rear extremity of the shaft 20. A sprocket chain $95^a$ engages the wheels $92^a$ and 95 and serves to transmit motion from the latter to the former.

*Drive and control mechanisms.*

At its central portion the shaft 20 has fixed thereto a bevel gear $97^a$ meshing with a similar bevel gear 98 fixed upon a shaft 99, the upper portion of said shaft 99 being journaled within a bracket 100 having bearings therein whereby it is supported upon the shaft 20.

Shaft 99 extends downwardly within the hollow column 2 and is provided near its lower end with a squared portion 101, upon which is slidably mounted a sleeve 102 having integral therewith or fixed thereto one element 103 of a cone clutch. 104 is a bracket member arranged at the rear side of the column 2 and within the same, said bracket extending upwardly from a boss 105 to which it is connected by means of bolt 106 and pin 107. While this mounting of the bracket is preferred, it is to be understood that the bracket may be otherwise mounted or be formed integral with the column if desired.

The upper end of the bracket is forked at 108 and has mounted therein a pivot pin 109, upon which is journaled a lever 110 which lies within the forks of the bracket 104 and extends forwardly toward the front of the column. The lever 110 also extends rearwardly of its pivot at 111 and is adapted to contact with the head of an adjustable stop screw 112 having screw threaded engagement with an extension 113 of the bracket 104. The lever 110, near its forward extremity, has an enlargement or boss 114, said boss being provided with a central opening 115 for the reception of the sleeve 102. 116 is a clamping collar surrounding the upper end of the sleeve 102 and engaging the upper surface of the boss 114. 117, 118 indicate the upper and lower elements of a ball race interposed between the lower surface of boss 114 and the cone clutch element 103, said ball race providing for a series of anti-friction balls 119.

The lever 110 extends forwardly beyond the boss 114 as seen at 120, and is provided at its forward extremity with an opening through which passes a pin 121, said pin forming a pivotal support for the forked extremities 122, 123 of upwardly and downwardly extending rods 124, 125, respectively. The upper extremity of the rod 124 is provided with an eye 126 with which the lower end of a spring 127 is engaged, the opposite end of said spring engaging a hook 128 carried by a link 129 pivotally mounted at 130 upon the forward arm 131 of a bell crank lever 132 pivoted upon a shaft 133 which is journaled within the head 4. The rear arm 134 of said lever has pivoted thereto at 135 a triangular support 136, said support providing journal bearings for a pair of rolls 137, 138, the latter being adapted to engage the belt 93 and to hold the same closely against the pulley 92. The rod 125 is extended downwardly toward the base of the machine, and at its lower extremity is provided with a forked element 139 journaled upon a pin 140 passing through a treadle lever 141. The treadle lever 141 is journaled at its rear extremity upon a pin 142 mounted in brackets 143, 144, extending upwardly from the base 1 to the rear of the column 2, the treadle lever passing forwardly through an opening $143^a$ in the column and out through an opening $144^a$ at the forward side thereof, being provided with a foot-engaging member 145 at its forward end.

146 is the main drive shaft of the machine, said shaft being journaled in bosses 147, 148 on the interior of the column 2 and having fixed thereto at its outer, right hand extremity a drive pulley 149. Within the column a bevel gear wheel 150 is fixed upon the shaft 146, said bevel gear meshing with a bevel gear 151 fast upon the lower end of a short shaft 152 journaled within a bearing 153 provided in the end of a bracket 154 which is connected by means of bolts 155 and pins 156 to a boss on the interior of the column 2, it being understood, however, that the bracket forming the support for this shaft may be otherwise connected or integral with the column if desired. Integral with the shaft 152 or fixed thereto in any suitable manner, is the drive element 157 of the cone clutch above referred to, said element cooperating with the element 103 to impart movement of rotation to the shaft 99, the lower end of said shaft at 158 being reduced in diameter and being seated within a socket 159 in said element 157.

Projecting inwardly from the rear, interior face of the column 2 is a boss 160 upon which is pivoted the lever arm 83, to the forward end of which is connected the flexible connection 80 as above described. Substantially midway of said lever is a pin 162, upon which is pivotally mounted the lower end of a link 163, said link having at 164 a turn buckle by means of which the length of the same may be adjustably determined. Upon a pin 165, extending transversely through the bracket $8^a$ and which pin forms a journal bearing for the guide pulley 81, are pivotally mounted the lever arms 166, 167, provided at their free extremities with openings in which is journaled a pin 168 upon which is pivotally supported the upper extremity of the link 163. Also journaled upon the pin 168 are the rear extremities of a pair of levers 169, 170, said levers being pivoted at their forward extremities upon a pin 171 mounted in a boss 172 formed upon the lever 87, the levers 166, 167 and 169, 170 together forming a toggle which, upon depression of the rod 163, is straightened out, thereby swinging the lever 87 forwardly.

The forward end of lever 83 has journaled therein a pin 173 forming a support for the forked upper extremity 174 of a rod 175, the lower forked end 176 of which is pivotally connected by means of a pin 177 to a treadle lever 178 the latter being journaled upon the pin 142 and extending forwardly through the base of the column 2 and having fixed upon its forward extremity a foot-engaging element 179. The foot-engaging element 179 is provided upon its right hand edge with an outwardly projecting boss 180 through which passes an adjustable set screw 181, the lower extremity of which is adapted to strike upon the upper surface of the foot-engaging element 145 carried upon the treadle arm 141, whereby to depress the same upon further downward movement of the treadle arm 178. Upon the rear of the bracket $8^a$ near its upper end is fixed a bracket arm 182 having an opening in its upper extremity within which is threaded a set screw 183 having a lock nut 184, said set screw being arranged in such position that its forward extremity may serve as a stop for the slide 31, whereby to limit the rearward movement of the latter.

Figure 2:
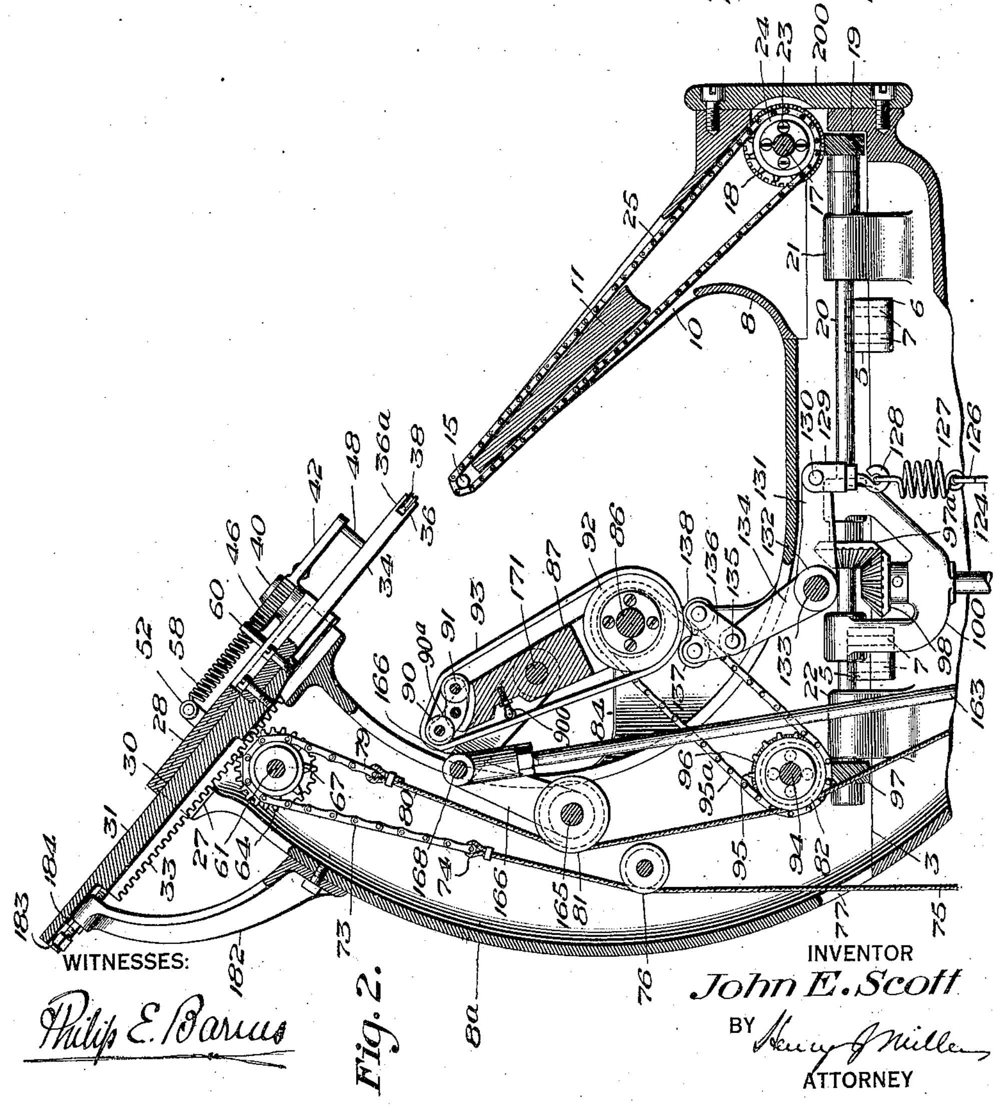
Fig. 2 is a longitudinal central vertical section from the left of the machine, the parts being shown in the same position as in Fig. 1, this view comprising the upper portion of the machine only.
Figures 3, 5:
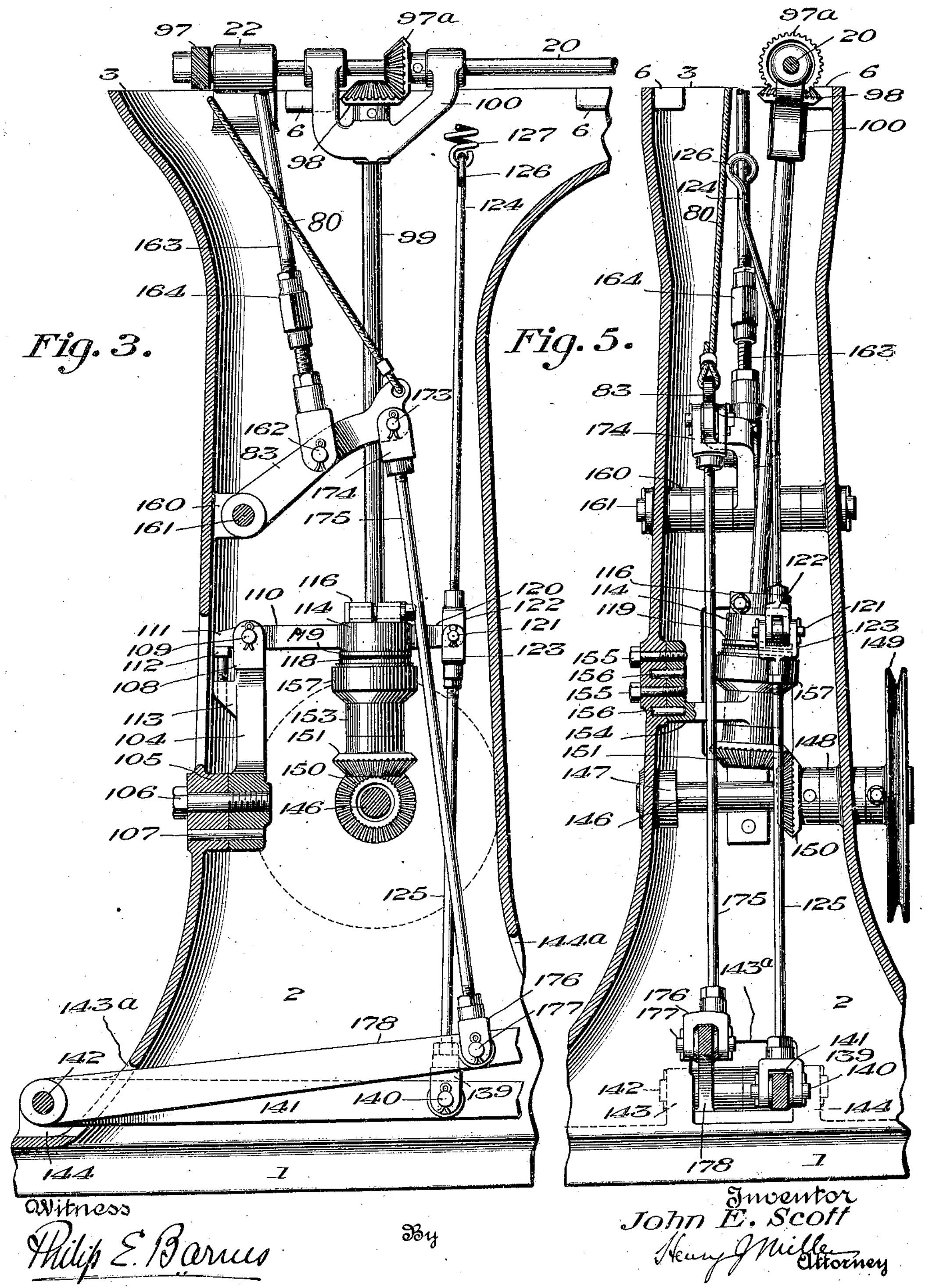
Fig. 3 is a section similar to Fig. 2 but showing the lower portion of the machine, certain parts thereof, however, being broken away.
Fig. 5 is a corresponding view of the lower portion of the machine.
Figures 6, 7, 8, 9, 10:
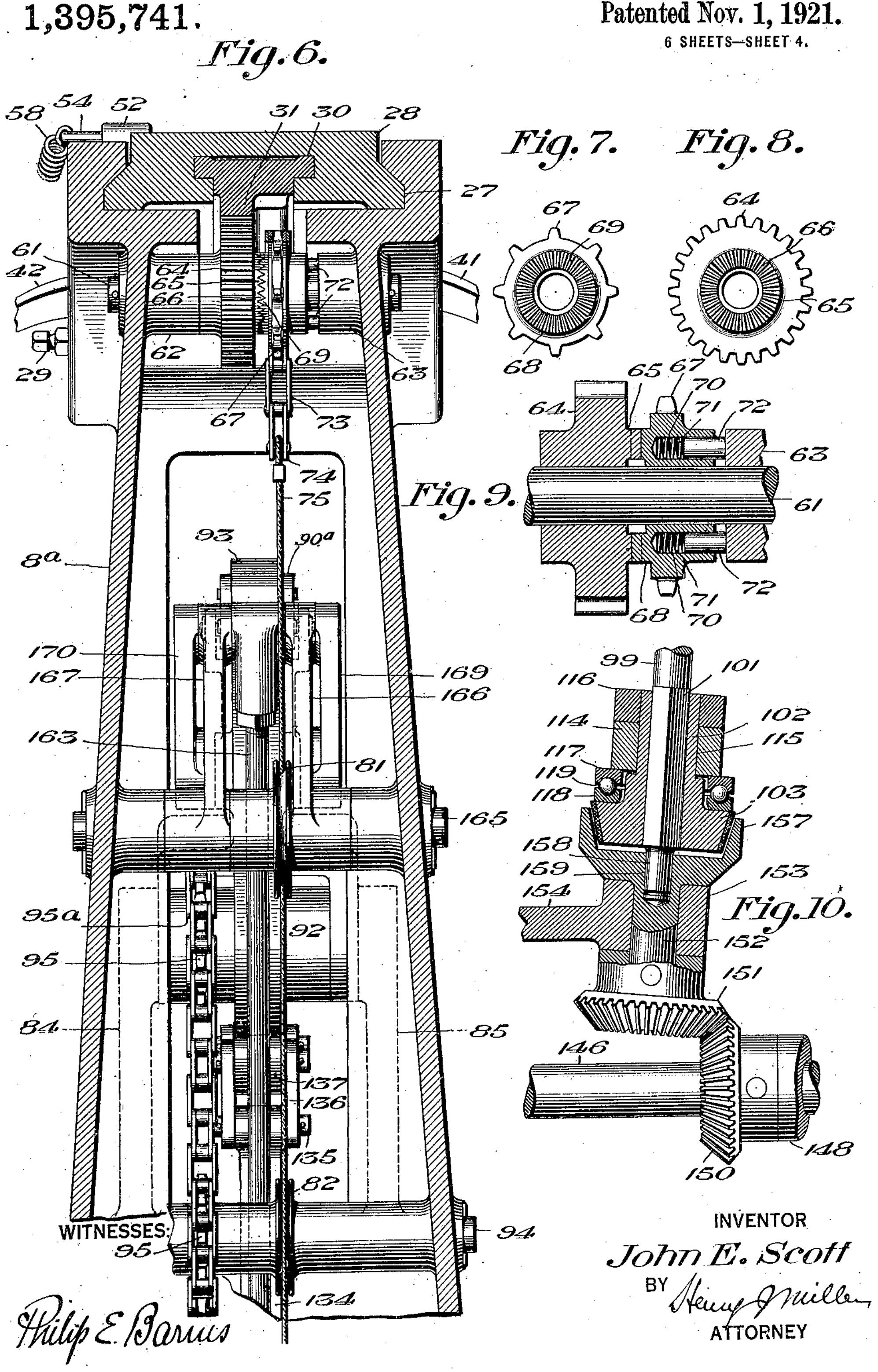
Fig. 6 is a cross section of the upper portion of the machine looking from the rear and on the line *c*–*d* (Fig. 1), this figure being drawn to enlarged scale and illustrating the controlling mechanism for the toe-expanding device.
Figs. 7, 8 and 9 are detail views of a friction clutch or escapement comprised in the connections for controlling the toe spreader.
Fig. 10 is a detail cross section of a clutch included in the main drive mechanism of the machine.
Figures 11, 12, 13, 14:
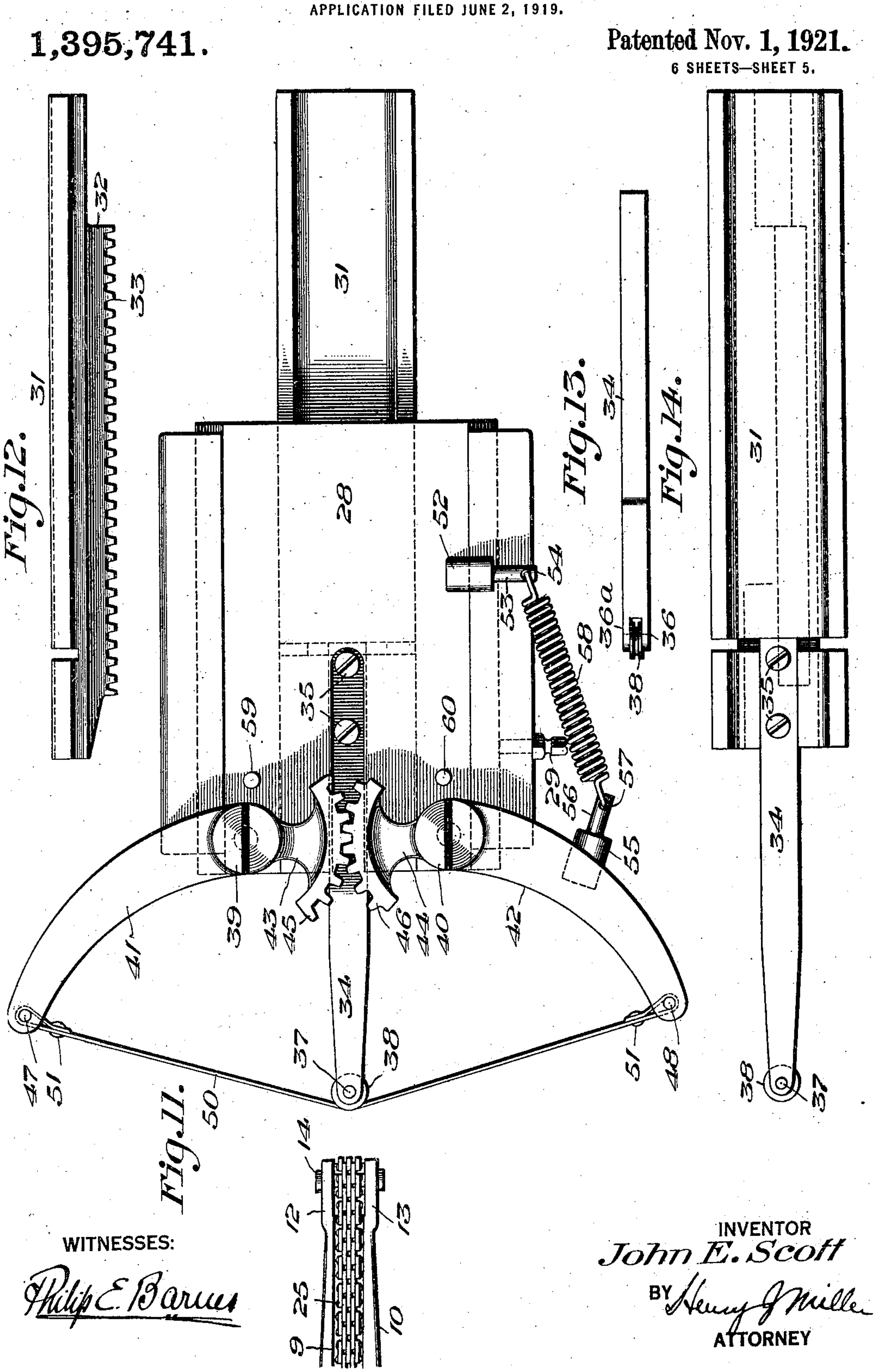
Fig. 11 is a top plan view of the toe-expanding device and the means for supporting the same, this view also indicating the relative position of said expanding device and one of the turning elements.
Fig. 12 is a detail side elevation of one of the component parts of the toe-expanding device.
Figs. 13 and 14 are further details of said toe-expanding device.

The operation of the above machine is as follows: With the parts as shown in Figs. 1 and 2, the operator bends the shoe, having the heel already turned, over the extremity of the horn 8, the interior surface of the shoe sole resting upon the flat upper surface of the horn and engaging the links of the chain 25 at that portion thereof adjacent the end of the horn, such engagement, however, being only effective near the extremity of the horn where the links in passing about the guide pulley 15 have their angular corners 26 extending beyond the body portion of the chain. The operator now places his foot upon the treadle element 179 and depresses the same, whereby through the connecting rod 175 the lever 83 is swung downwardly. As the lever 83 moves downwardly the cord 80 is drawn down, thereby, through the operation of chain 73, causing a rotation of the sprocket wheel 67, the weight 78 at this time being lifted from its normal position.

As the sprocket wheel 67 is rotated the teeth 69 which engage the teeth 66 tend to rotate the gear wheel 64, the springs 71 at this time serving to resiliently hold the teeth 66 and 69 in engagement. As the gear wheel 64 is rotated the rack 33 together with the slide 31 will be moved downwardly toward the horn 8, and as the slide 31 moves downwardly carrying with it the rod 34 and the supporting pulley 38 the latter by engagement with the central portion of the belt 50 causes the arms 41, 42 to swing toward one another in opposition to the tension of spring 58. As the slide continues to move forwardly the pulley 38 together with the central portion of the belt 50 enters within the toe portion of the shoe, as clearly seen in Figs. 15 and 16, the portions of the belt which lie between the pulley 38 and the pins 47, 48, respectively, bearing against the interior surface of the upper of the unturned shoe.

As the lever 83 moves downwardly the connecting rod 163 is also depressed and thereby straightens the toggle formed by the pairs of links 166, 167; 169, 170, respectively, thereby swinging the lever 87 downwardly with increasing pressure until the belt 93 is brought to bear at a point between the guide pulleys 90, 91 against the convexly bent outer or finished surface of the sole as clearly seen in Fig. 16. As the stretch of belt between the pulleys 90, 91 flexes inwardly somewhat under pressure, the same is caused to frictionally contact with the surface of the sole over a considerable area.

As the treadle member 179 is now further depressed the end of the set screw 181 will contact with the treadle member 145, thereby depressing the latter to a sufficient amount to cause the cone clutch element 103 through the connections 125, 120 and 114 to engage the clutch element 157, which is constantly rotated by its connections to the drive shaft 146, this depression of the treadle through the connections 125 and 124 further causing the rolls 137, 138 to be resiliently brought into engagement with the outer surface of the belt 93 for holding the same against slipping relatively to the pulley 92.

As soon as the shaft 99 begins to rotate, the chain 25 is caused to travel in a counterclockwise direction and the belt 93 in a clockwise direction, as seen in Fig. 2, whereby the shoe sole, which is clamped under considerable pressure between these two moving elements, is fed rearwardly over the end of the horn 8 the outwardly extending angular corners of the links of chain 25 gripping the unfinished side of the sole in a positive manner, while the belt 93 frictionally engages the grain side of the sole. As the sole is fed over the end of the horn the shoe is caused to turn inside out, the operator during this time holding the edges of the upper and pulling slightly to assist the machine in performing its operation. During the final movement of the treadle 179 after the toe-engaging element 50 has been properly positioned, the clutch teeth 66, 69 slip relatively to one another whereby such further movement of the treadle is permitted to take place without causing damage to the shoe.

As the operator maintains the treadle 179 in its extreme depressed position during the turning operation, and as the shoe is caused to travel over the end of the horn, it is evident that the toe of the shoe must move rearwardly and as the roll 38 and the flexible band 50 are positioned within the extremity of the toe, it is clear that these elements must move backwardly with the shoe. The friction clutch comprising the teeth 66, 69 permits such movement to take place although the treadle 179 is maintained in its depressed position, and during such rearward movement of the element 50 the tension of the spring 58 acting through the lever arms 41, 42 tends to expand the opposite portions of the belt 50 into contact with the interior of the shoe upper, thereby serving to hold the latter under tension, and to prevent the formation of wrinkles therein during the operation. This tensioning of the upper is similar to that which is produced by the hand of the operator in the hand turning operation for as the extermities of the arms 41, 42 tend to move outwardly in a path substantially at right angles to the axis of the shoe, the strap 50 tends to bend outwardly where it emerges from the interior of the upper at which point the upper is bent forwardly. As the shoe is turned and its tip moves rearwardly together with member 34, the points at which the strap emerges from the upper gradually approach the middle point of the strap, and the effect is substantially the same as if the ends of the strap were being continually pulled outwardly at each side from a central supply producing a continuous frictional drag in an outward direction upon the bend of the upper which tends to roll or curl the upper outwardly, thus facilitating the turning operation.

The operation thus proceeds until the shoe has been fully turned, when the operator removes his foot from the treadle causing the machine to stop and permitting the lever 87 to move backwardly into its rearward position, as seen in Fig. 1, this movement taking place by reason of the action of weight 78, which serves to raise the lever 83 immediately upon release of the treadle 179. The downward movement of the weight 78 also serves to give the slide 31 its final rearward movement until the latter contacts with the set screw 183 whereupon the parts are in position for the repetition of the operation.

In dealing with shoes of widely varying sizes, it will be found necessary to change the initial position of the slide 31 and lever arms 41, 42, and for this purpose the slidable supporting member 28 and the stop screw 183 have been provided. While the adjustable contact element 181 has been described as a means for actuating treadle 145 upon depression of treadle 179, it is evident that treadle 145 may be independently actuated at will and furthermore, if desired, member 181 might be entirely omitted and the operator could so position his foot on member 179 as to overlap member 145 whereby to actuate the latter at the proper time. If desired, the machine may be provided as at 200 with a plate, against which the operator may lean in manipulating the shoe for turning the same.

Having thus described the invention together with a preferred embodiment of the same what I claim and desire to secure by Letters Patent of the United States is,—

1. A shoe turning machine having, in combination, an endless sole feeding device, said device comprising a series of spurs normally lying within the body of the device, and means for moving said device to feed a sole during the turning operation the parts being constructed and arranged to cause said spurs to project beyond the body of the device during a portion of the movement of said device.

2. A turning machine having, in combination, a shoe-supporting horn having a substantially flat shoe-supporting surface, and a turning device comprising a member movable within a guide channel in said horn and exposed for contact with the shoe only at a point adjacent the extremity of the horn.

3. In a turning machine, in combination, a shoe-supporting horn provided with a longitudinal groove, and a turning device comprising an endless link belt movable within said groove.

4. A turning machine having, in combination, a shoe-supporting horn provided with a longitudinal groove, guide members rotatably supported adjacent opposite extremities of said horn, and an endless chain passing over said guide members and having a portion of its length located within said groove.

5. A turning machine having, in combination, a pivoted frame, a pulley coaxial with said frame, a guide pulley upon the free extremity of the frame, an endless belt passing over said pulleys, and means for pressing said belt into contact with said first pulley.

6. In a machine of the class described, an endless belt constructed and arranged for engagement with the sole of a lasted shoe, and means for guiding and supporting said belt, said means comprising a pivotally mounted rocker member and a pair of guide pulleys journaled thereon.

7. A machine of the class described having, in combination, an endless, sole engaging belt and means for guiding and supporting said belt, said means comprising a curved rocker member centrally pivoted and a pair of guide pulleys journaled adjacent the respective extremities of said rocker.

8. In a machine for turning the toe portions of shoes, in combination, mechanism for progressively gripping and feeding the shoe sole, and means for maintaining the toe portion of the upper in distended condition.

9. In a shoe turning machine, in combination, power operated devices for contacting with opposite sides of a sole of a shoe to be turned, means for actuating said devices to advance a shoe sole by progressive engagement thereof by said devices for turning the toe portion of the shoe, and mechanism for maintaining the toe portion of the shoe upper in distended condition during the turning operation.

10. A turning machine having, in combination, a turning device movable unidirectionally, a second turning device also movable unidirectionally, means for supporting said second device for movement into and out of coöperative relation to said first device, common power means for driving said two devices and a treadle-actuated clutch for controlling said power means.

11. In a shoe turning machine, in combination, a turning device constructed and arranged for contact with the sole of a lasted shoe, said device being arranged for unidirectional movement, a coöperating turning device, and power means for actuating each of said devices, said means including a friction clutch and a treadle for said clutch.

12. A turning machine comprising a turning device, a second turning device movable into coöperative relation with said first device, an upper expanding element movable toward and into proximity to said first device, power means for actuating said turning devices and treadle means constructed and arranged to first move said second turning device and said expanding element into operative relation to said first device, and to thereafter set in motion said power means.

13. In a machine of the class described, in combination, shoe turning devices, a frame member providing a fixed guide, a supporting member rectilinearly adjustable along said guide, and upper distending means slidably mounted upon said supporting member.

14. A machine for turning shoes having, in combination, shoe turning devices, a frame member providing a guide slot, a supporting member adjustably fixed within said guide slot and upper distending means carried by said supporting member, said means comprising a member movable longitudinally of said supporting member and toward and from the turning devices.

15. A shoe turning machine having, in combination, turning means, power mechanism for actuating said means, a foot-actuable treadle for controlling the operation of said turning means, a flexible band-like device for engaging the shoe during the turning operation, and a second treadle for positioning said device.

16. In a machine for turning shoes, in combination, turning devices, and means constructed and arranged to engage the interior of the unturned upper and to roll the same outwardly at the bend thereof during the turning operation.

17. In a shoe turning machine, turning means, power driven mechanism for actuating said turning means, and means frictionally engageable with the interior of the upper and tending to roll the same outwardly during the turning operation.

18. In a shoe turning machine, in combination, devices for turning the toe portion of the shoe, and flexible means for laterally distending the toe portion of the upper and for exerting an outward drag upon the bend thereof during turning.

19. A machine of the class described having, in combination, shoe turning devices and upper distending means, said means comprising a unitary strap or band arranged for insertion within the upper of the shoe and to expand the latter laterally.

20. In a shoe turning machine, in combination, turning devices, and a shoe upper distended device, said device comprising a band-like flexible member guided to move rectilinearly from a normally retracted position toward said turning devices and into the interior of a shoe upper positioned thereon for turning.

21. A machine of the class described having, in combination, turning devices and upper distending means, said means comprising a flexible strap or band arranged for insertion into the shoe upper, and devices for tensioning said strap or band outwardly into engagement with the interior surface of the unturned upper.

22. In a shoe turning machine, in combination, shoe turning devices, and an upper distending device comprising a rigid support arranged for insertion into the toe portion of the upper, a flexible element having operative connection with said support, and means for tensioning said element against the upper to distend the same.

23. In a machine of the class described, in combination, shoe turning devices, and an upper distending device comprising a support arranged for insertion into the toe portion of a shoe upper, a flexible element operatively engaging said support at one portion of the length of said element, and means for moving another portion of said element outwardly from said support and into engagement with the shoe upper.

24. In a shoe turning machine, in combination, shoe turning instrumentalities and upper distending devices comprising an elongated support arranged for insertion into the toe portion of a shoe, a flexible member having its central portion operatively engaging said support, and means for oppositely tensioning the free extremities of said member into contact with the shoe upper for outwardly distending the same.

25. In a machine of the class described, in combination, an upper-distending device comprising an elongated member arranged for insertion into the toe portion of a shoe, an anti-friction guide mounted upon the extremity of said member, a flexible band having its central portion in engagement with said guide, and means for simultaneously swinging the free extremities of said band outwardly and into engagement with the shoe upper for extending the latter laterally.

26. In a shoe turning machine, in combination a sole engaging, shoe turning instrumentality, and a device arranged for insertion into the toe portion of a shoe upper said device having elements arranged to be oppositely moved outwardly and into contact with the shoe upper, a pair of pivoted lever arms having freely swingable connection with the respective elements, and means for oppositely swinging said arms.

27. In a shoe turning machine, in combination, a flexible strap or band arranged for insertion into the toe portion of a shoe upper, means for supporting the central portion of said strap substantially in contact with the extremity of the interior of the toe portion of the upper, a pair of lever arms having their free extremities connected to the respective ends of said strap, and resilient means tending to swing the extremities of said levers in opposite directions.

28. A toe-distending device for use in shoe turning machines comprising a flexible member, means for supporting the central portion of said member substantially in contact with the extreme interior point of the toe portion of the shoe upper to be turned, a pair of pivoted levers provided with long and short arms, intermeshing gear segments carried by the respective short arms, means for engaging the free extremities of the said flexible member carried by the respective long arms, and resilient means tending to swing said long arms outwardly.

29. In a machine of the class described, shoe turning devices, a movable toe distending element independent of said devices and normally held in retracted position, means for moving said element forwardly in a substantially rectilinear path and into engagement with a shoe, and means for moving the shoe in a direction to cause said element to recede to substantially normal position.

30. In a shoe turning machine, in combination, a device shaped to distend the toe of a shoe, shoe turning means, means for supporting said distending device for movement toward and from said turning means and mechanism for moving said distending device toward the turning means and comprising a giveway connection, said turning means being constructed and arranged to force a shoe against said distending device whereby the latter is moved in a direction away from said turning device.

31. In a shoe turning machine, a turning element having a unidirectional feed movement, an upper-distending device movable toward and from said turning element, and mechanism for moving said device toward said element, said mechanism comprising a connection permitting movement of said device in a direction away from the turning element under pressure of the shoe thereon during the feeding of the shoe.

32. In a shoe turning machine, a horn having a rearwardly inclined shoe supporting surface, turning means carried by said horn, an upper distending element movable toward and from said horn, means for guiding said element for movement in a substantially rectilinear path and in a plane substantially parallel to said supporting surface, and means for moving said element.

33. In a machine of the class described, in combination, turning devices and toe-distending means, said means comprising an element movable into the toe of a shoe to be turned, drive mechanism for moving said element and a clutch interposed between said element and mechanism, said clutch permitting movement of the said element independently of the drive member.

34. In a shoe turning machine, in combination, a shoe-supporting horn, a turning device carried thereby, mechanism for imparting to said device a unidirectional shoe feeding movement, a support spaced from said horn, an upper distending element mounted upon said support and movable toward and from said horn, and mechanism including a giveway clutch for moving said element toward the horn and into the toe of a shoe supported thereon, said element moving in a direction away from the horn under pressure of the shoe during the feed movement of the latter.

35. In a machine for turning shoes, in combination, turning devices, and expansible means coöperating therewith to distend the toe portion of the shoe upper during turning, said means comprising a slide movable toward and from said devices, said slide being provided with a rack, a pinion operatively engaging said rack, and means under the control of the operator for rotating said pinion.

36. A machine for turning shoes, comprising a support equipped with endless, unidirectional power driven means for engaging and advancing the sole of the shoe, and means movable from an inoperative position and provided with an element operative to distend the shoe upper at the toe during turning.

37. In a machine of the class described, in combination, a horn having a rearwardly and upwardly inclined shoe-supporting surface, an upper distending element rectilinearly slidable from normally inoperative rearward position downwardly and forwardly into proximity to the surface of said horn and into the interior of a shoe supported thereon, and means for moving said shoe rearwardly over the surface of the horn whereby the distending element is caused to gradually recede as the shoe tip approaches the rearward extremity of the horn.

38. A shoe turning machine having, in combination, turning means, power mechanism for actuating said means, a foot actuable treadle for controlling the operation of said means, an upper distending device normally in inoperative position and means under control of the operator for moving said distending device into operative position, said last named means comprising a part arranged to contact with said treadle whereby to operatively depress the same.

39. A machine of the class described having, in combination, toe-distending means comprising a member movable into position to engage the interior of the upper of a shoe to be turned, and means for moving said member into shoe-engaging position, said means comprising a drive element, a driven element, and a friction clutch normally connecting said elements but permitting movement to be imparted to said driven element independently of said drive element.

40. A shoe turning machine having, in combination, turning devices, toe-distending means comprising a slide member movable toward and from said turning means, a rack fixed to said slide, a shaft, a pinion thereon meshing with said rack, a sleeve member rotatable upon said shaft adjacent the pinion, a foot treadle, connections from said treadle to said sleeve member for rotating the latter, and a friction clutch interposed between the pinion and sleeve member, whereby upon depression of the treadle said pinion may be rotated to advance the rack, but may be rotated reversely, independently of said sleeve member by rearward movement of the rack.

In testimony whereof I have signed my name to this specification.

JOHN E. SCOTT.